United States Patent
Lee et al.

(10) Patent No.: US 9,262,014 B2
(45) Date of Patent: Feb. 16, 2016

(54) TOUCH RECOGNITION APPARATUS OF CURVED DISPLAY

(71) Applicant: HYUNDAI MOTOR COMPANY, Seoul (KR)

(72) Inventors: Jong Bok Lee, Suwon-si (KR); Gideok Kwon, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/514,085

(22) Filed: Oct. 14, 2014

(65) Prior Publication Data

US 2015/0185962 A1    Jul. 2, 2015

(30) Foreign Application Priority Data

Dec. 31, 2013    (KR) .................. 10-2013-0168910

(51) Int. Cl.
*G06F 3/044* (2006.01)
*G06F 3/042* (2006.01)

(52) U.S. Cl.
CPC .................................. *G06F 3/0423* (2013.01)

(58) Field of Classification Search
CPC ... G06F 3/0412; G06F 3/0416; G06F 3/0488; G06F 3/044
See application file for complete search history.

(56) References Cited

U.S. PATENT DOCUMENTS

| | | | |
|---|---|---|---|
| 2009/0128499 A1 | 5/2009 | Izadi et al. | |
| 2010/0315360 A1 | 12/2010 | Lee | |
| 2014/0313746 A1* | 10/2014 | Song | G06F 1/1626 362/362 |
| 2015/0116218 A1* | 4/2015 | Yang | G06F 21/31 345/158 |
| 2015/0185962 A1* | 7/2015 | Lee | G06F 3/0423 345/175 |
| 2015/0256658 A1* | 9/2015 | Shin | G02F 1/1333 455/566 |

FOREIGN PATENT DOCUMENTS

| | | |
|---|---|---|
| KR | 10-2011-0066858 A | 6/2011 |
| KR | 10-1115854 B1 | 2/2012 |
| KR | 10-2013-0031050 A | 3/2013 |
| KR | 10-2013-0084440 A | 7/2013 |

* cited by examiner

*Primary Examiner* — Ricardo L Osorio
(74) *Attorney, Agent, or Firm* — McDermott Will & Emery LLP

(57) ABSTRACT

A touch recognition apparatus of a curved display according to an exemplary embodiment of the present invention includes a curved screen on which an image is displayed. A transparent plate is disposed behind the curved screen. An infrared lamp is provided in a lateral side of the transparent plate and irradiating infrared light. A uniformity tape is bonded or coated onto the lateral side of the transparent plate and irradiates the infrared light irradiated from the infrared lamp to the curved screen while spreading the infrared light to the transparent plate. An infrared camera is configured to photograph an infrared image reflected from the curved screen.

10 Claims, 6 Drawing Sheets

TOUCH RECOGNITION APPARATUS OF CURVED DISPLAY

CROSS-REFERENCE TO RELATED APPLICATION

This application claims the benefit of priority to Korean Patent Application No. 10-2013-0168910 filed in the Korean Intellectual Property Office on Dec. 31, 2013, the entire contents of which are incorporated herein by reference.

TECHNICAL FIELD

The present disclosure relates to a touch recognition apparatus of a curved display. More particularly, the present disclosure relates to a touch recognition apparatus of a curved display that can reduce the production cost by minimizing the number of infrared lamps provided for recognizing user touch of the curved display.

BACKGROUND

With development of vehicle functions, various input devices for controlling the vehicle functions have been also developed. Recently, a method of using a touch screen for a cluster or an audio video navigation (AVN) of vehicles has been applied.

In general, since the touch screens provided in the vehicles are positioned ahead of a driver's seat, the spatial use is not efficient. Further, the touch screens are limited for a curved shape of mounting locations in the vehicles.

The curved displays mounted in the vehicles require a device for recognizing a touch by a user but not recognizing a touch by an object. For such a demand, a technology for recognizing a touch by a user using infrared light, has been used in a related art.

FIG. 1 is a schematic diagram illustrating a common curved display that recognizes a user touch for curved displays according to the related art. FIG. 2 is a schematic diagram illustrating the relationship between a curved screen and an infrared lamp according to the related art.

As shown in FIG. 1 and FIG. 2, a curved display apparatus according to the related art includes a curved screen 10, a projector 20 disposed behind the curved screen 10 and projecting an image to the curved screen 10, an aspheric mirror 30 reflecting the image projected from the projector 20, and a reflective mirror 40 transferring the image reflecting from the aspheric mirror 30 to the curved screen 10.

In order to recognize a touch by a user on the curved screen 10, infrared light is emitted from an infrared lamp 70 behind the curved screen 10, and an infrared image reflecting from the curved screen 10 is photographed by an infrared camera 50. Whether the user has touched the curved screen 10 is determined by analyzing the photographed infrared image.

However, according to the related art, since the infrared light is irradiated to the entire region of the curved screen, a large amount of light from the infrared lamp 70 is required.

A diffuser needs to be provided at rear side of the curved screen, since it is difficult for the infrared light to be uniformly irradiated to the entire region of the curved screen. Therefore, the manufacturing cost of the curved display apparatus is increased.

Further, since the infrared light is not uniformly irradiated to the entire region of the curved screen, sensitivity of determining whether a user touches the curved screen 10 is not uniformly maintained.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide a touch recognition apparatus of a curved display that minimizes a number of infrared lamps used to detect user touch and to provide a touch recognition apparatus that reduces production cost.

In addition, the present disclosure provides a touch recognition apparatus that can constantly maintain sensitivity of detection of a user touch by uniformly irradiating infrared light to a curved screen.

A touch recognition apparatus of a curved display according to an exemplary embodiment of the present invention may include a curved screen on which an image is displayed. A transparent plate is disposed behind the curved screen. An infrared lamp is provided in a lateral side of the transparent plate and irradiates infrared light. A uniformity tape is bonded or coated onto the lateral side of the transparent plate and irradiates the infrared light irradiated from the infrared lamp to the curved screen while spreading the infrared light to the transparent plate. An infrared camera is configured to photograph an infrared image reflected from the curved screen.

The transparent plate may have a shape corresponding to the curved screen.

The infrared lamp may be provided in the lateral side of the transparent plate in plural.

The infrared camera may be disposed in an opposite side of the curved screen based on the transparent plate.

According to another exemplary embodiment of the present invention, a touch recognition apparatus of a curved display includes a curved screen on which an image is displayed. A transparent plate is provided in a rear of the curved screen. At least one infrared lamp is provided in a lateral side of the transparent plate and irradiates infrared light. A uniformity tape is disposed between the transparent plate and at the least one infrared lamp and spreads the infrared light irradiated from the infrared lamp to the transparent plate. An infrared camera is configured to photograph an infrared image reflected from the curved screen.

The transparent plate may have a shape corresponding to the curved screen.

The infrared camera may be disposed in an opposite side of the curved screen based on the transparent plate.

According to the exemplary embodiment of the present invention, since a transparent plate coated with a uniformity tape is disposed behind a curved screen, and infrared light is irradiated to a lateral side of the transparent plate, the infrared light uniformly spreads to the entire region of the curved screen and the number of infrared lamps can be minimized.

Further, since infrared light is uniformly irradiated to the curved screen, it is possible to maintain sensitivity of a user touch.

In addition, since it is possible that a quantity of infrared light can be constantly maintained by a small number of infrared lamps, hovering touch can be realized when a user does not directly touch the curved screen.

BRIEF DESCRIPTION OF THE DRAWINGS

The drawings are provided for reference in describing exemplary embodiments of the present invention, and the spirit of the present invention should not be construed only by the accompanying drawings.

DETAILED DESCRIPTION OF THE EMBODIMENTS

Figure 1:
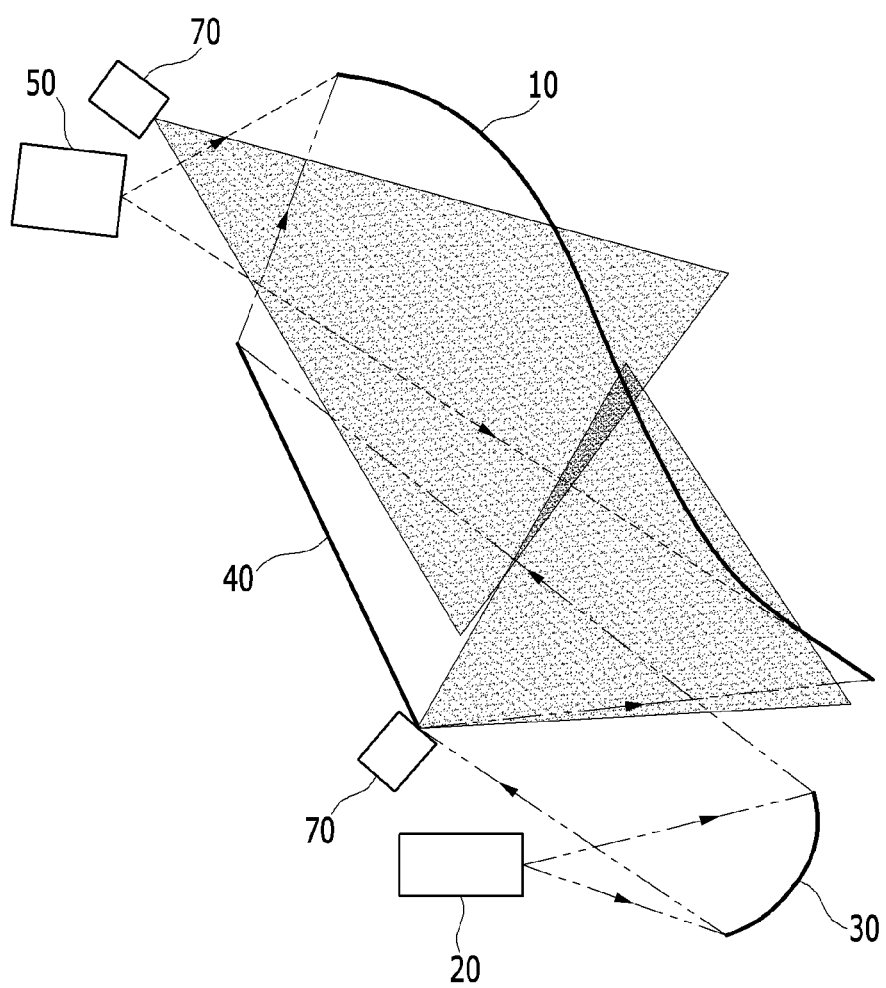
FIG. 1 is a schematic diagram illustrating a common curved display that recognizes a user touch for curved displays according to the related art.
Figure 2:
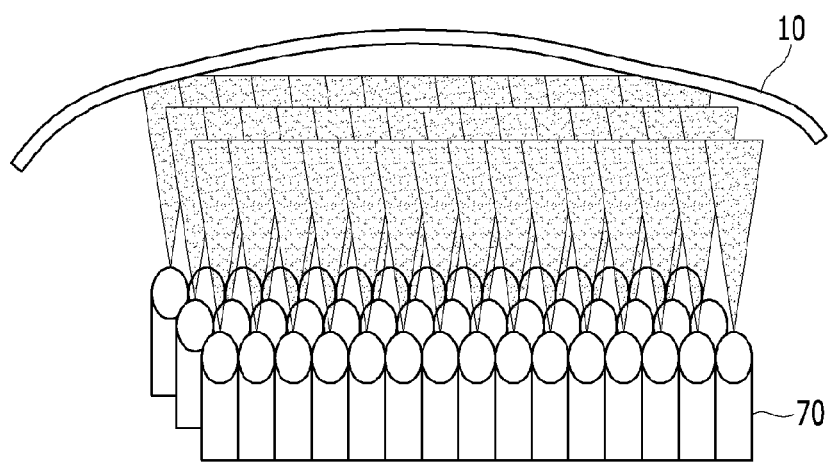
FIG. 2 is a schematic diagram illustrating the relationship between a curved screen and an infrared lamp according to the related art.

The present disclosure will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Accordingly, the drawings and description are to be regarded as illustrative in nature and not restrictive, and like reference numerals designate like elements throughout the specification.

The sizes and thicknesses of the configurations shown in the drawings are provided selectively for convenience of description, such that the present invention is not limited to those shown in the drawings, and the thicknesses are exaggerated to make some parts and regions clear.

Figure 3:
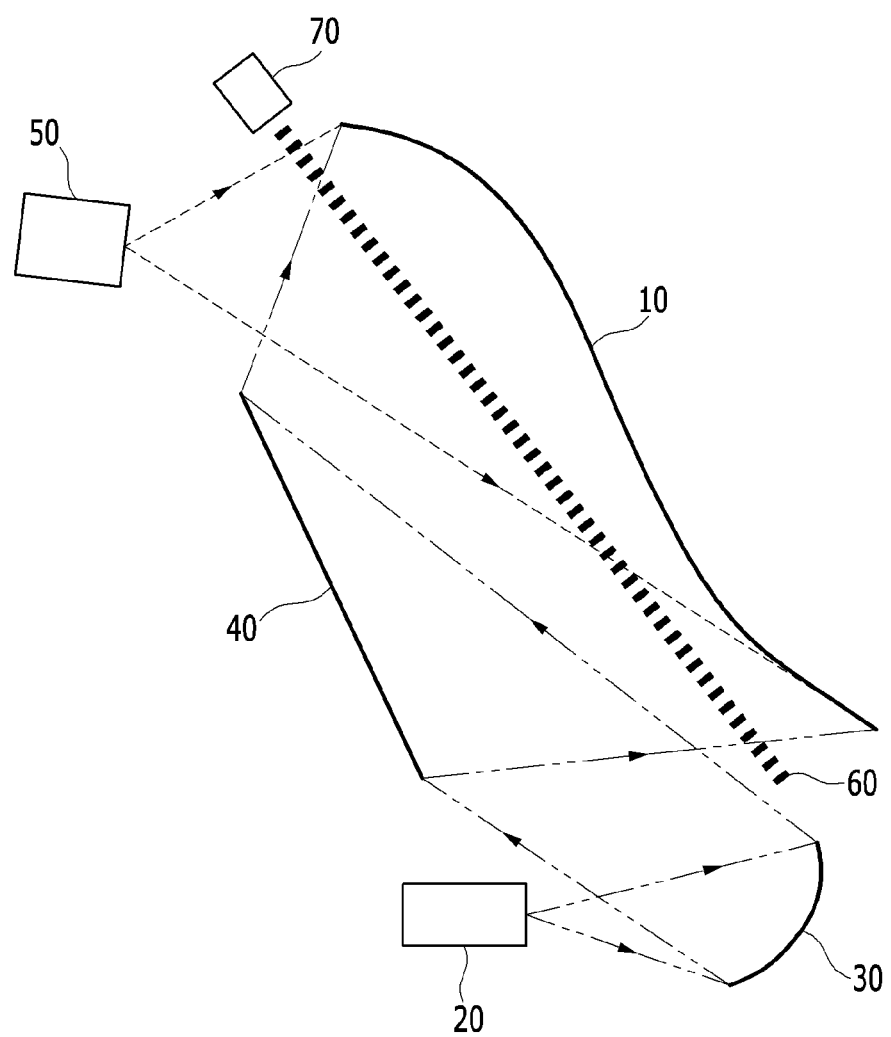
FIG. 3 is a schematic diagram illustrating a touch recognition apparatus of a curved display according to an exemplary embodiment of the present invention.

FIG. 3 is a schematic diagram illustrating a touch recognition apparatus of a curved display according to an exemplary embodiment of the present invention.

As shown in FIG. 3, a curved display apparatus according to an exemplary embodiment of the present invention includes a curved screen 10 on which an image is displayed. A projector 20 is disposed behind the curved screen 10 and projects an image to the curved screen 10. An aspheric mirror 30 reflects the image projected from the projector 20, and a reflective mirror 40 transfers the image reflected from the aspheric mirror 30 to the curved screen 10.

The projector 20 receives light produced by a light source (not shown) and projects the light to the curved screen 10 to generate the image to be displayed on the curved screen 10.

The curved screen 10 is composed of an acryl plate and a rear transmission film which is bonded to the acryl plate. In order to mount the curved screen 10 to a front part of a vehicle, a bezel is fitted in the outer edge of the curved screen and is fixed to the front part of the vehicle.

The aspheric mirror 30 and the reflective mirror 40 are disposed between the projector 20 and the curved screen 10. Thus, the light from the projector 20 reflected from the aspheric mirror 30 travels to the reflective mirror 40. The light is reflected from the reflective mirror 40 to the curved screen 10, such that an image is displayed on the curved screen 10.

In order to determine the user touch, the curved display apparatus includes an infrared lamp 70 irradiating infrared light. A transparent plate 60 is disposed behind the curved screen 10 and projects the infrared light irradiated from the infrared lamp 70 to the curved screen 10. An infrared camera 50 photographs an infrared image reflected from the curved screen 10.

The infrared camera 50 may be disposed at an opposite side of the curved screen 10 based on the transparent plate 60.

Figure 4:
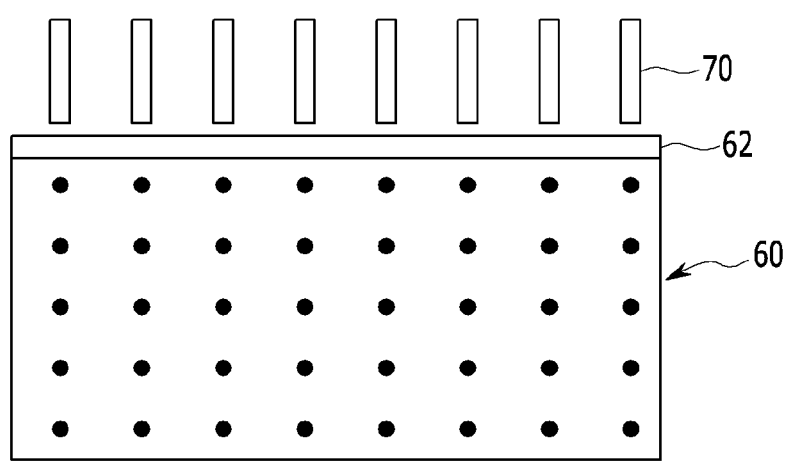
FIG. 4 is a schematic view illustrating a relationship between a transparent plate and an infrared lamp according to an exemplary embodiment of the present invention.
Figure 5:
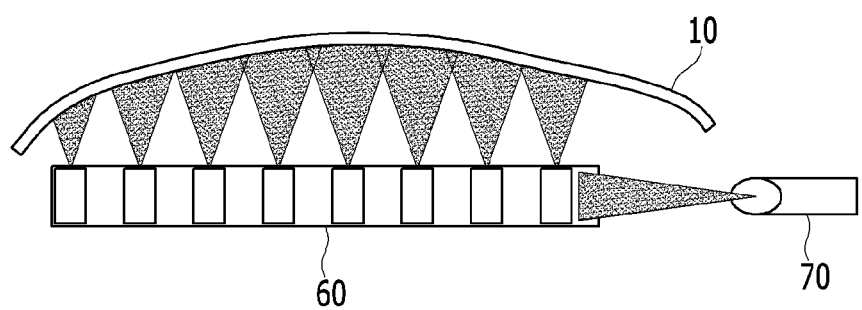
FIG. 5 is a schematic view illustrating a relationship between a transparent plate and an infrared lamp according to an exemplary embodiment of the present invention, taken in a different direction.

FIG. 4 is a schematic view illustrating a relationship between a transparent plate and an infrared lamp according to an exemplary embodiment of the present invention. FIG. 5 is a schematic side view illustrating a relationship between the transparent plate and the infrared lamp according to the exemplary embodiment of the present invention.

A shown in FIG. 4 and FIG. 5, the infrared lamp 70 is disposed in a lateral side of the transparent plate 60. A uniformity tape 62 is bonded onto the lateral side of the transparent plate 60 on which the infrared light irradiated from the infrared lamp 70 is projected to the curved screen 10.

The infrared light irradiated from the lateral side of the transparent plate 60 passes through the uniformity tape 62 and is irradiated to the curved screen 10 facing the transparent plate 60. At this time, the infrared light irradiated from the transparent plate 60 is irradiated to the curved screen 10 while the infrared light is uniformly spread to the transparent plate 60. The uniformity tape 62 may be from 3M™.

Figure 6:
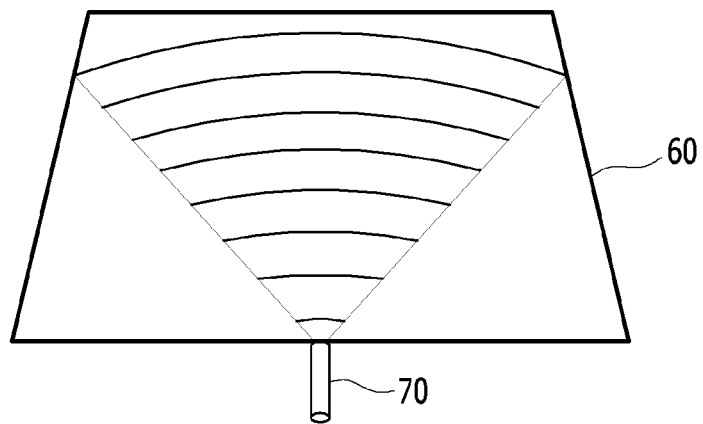
FIG. 6 is a schematic view illustrating the configuration in which infrared light is irradiated to a transparent plate according to an exemplary embodiment of the present invention.

FIG. 6 is a schematic view illustrating the configuration in which infrared light is irradiated to the transparent plate according to the exemplary embodiment of the present invention. As shown in FIG. 6, when the infrared light is irradiated to a lateral side of the transparent plate 60, it is uniformly spread to the entire region of the transparent plate 60.

The transparent plate 60 may be made of a transparent acryl material. Since the transparent plate 60 is made of a transparent acryl material, light in a range of visible rays irradiated from the projector 20 passes through the transparent plate 60 and is projected to the curved screen 10.

The transparent plate 60 may be formed in a shape corresponding to the curved screen 10. Since the transparent plate 60 is formed in a shape corresponding to the curved screen 10, the infrared light irradiated from the lateral side of the transparent plate 60 can be uniformly irradiated to the entire region of the curved screen 10.

Hereinafter, a method of the touch recognition apparatus of the curved display according to an exemplary embodiment of the present invention will be described in detail.

As shown in FIG. 3, a light source provided in the projector 20 irradiates light combining red, green, blue (RGB) to the aspheric mirror 30 for projecting the image to the curved screen 10. The RGB light irradiated from the projector 20 is reflected from the aspheric mirror 30 and projected to the reflecting mirror 40. The RGB light reflected from the reflecting mirror 40 is projected to the curved screen 10.

In order to determine a user touch of the curved screen 10, infrared light irradiated from the infrared lamp 70 is irradiated to a lateral side of the transparent plate 60. Since the uniformity tape 62 is bonded to the lateral side of the transparent plate 60, the infrared light irradiated to the lateral side of the transparent plate 60 spreads to the entire region of the transparent plate 60. The Infrared light spreading in the entire region of the transparent plate 60 is irradiated to the curved screen 10.

The infrared camera 50 photographs the infrared image irradiated to the curved screen 10. When a user touches the curved screen 10, the infrared light irradiated to a portion of the user touch is blocked. Therefore, it is possible to determine whether the user touches the curved screen 10 by analyzing the image photographed by the infrared camera 50.

Since infrared light uniformly spreads to the entire region of the transparent plate 60 by the uniformity tape 62, it is possible to minimize the number of infrared lamps 70, thereby reducing the manufacturing cost.

Further, although a small number of infrared lamps 70 are provided, the quantity of infrared light is constantly maintained by the uniformity tape 62. Therefore, it is possible to maintain sensitivity of the user touch.

Accordingly, even if the user does not directly touch the curved screen 10, it is possible to recognize a close touch or a hovering touch when a specific operation close to the curved screen 10 is performed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A touch recognition apparatus of a curved display, comprising:
   a curved screen on which an image is displayed;
   a transparent plate disposed behind the curved screen;
   an infrared lamp provided in a lateral side of the transparent plate, the infrared lamp irradiating infrared light;
   a uniformity tape bonded or coated onto the lateral side of the transparent plate, and the infrared lamp irradiating the infrared light irradiated from the infrared lamp to the curved screen while spreading the infrared light to the transparent plate; and
   an infrared camera configured to photograph an infrared image reflected from the curved screen.

2. The touch recognition apparatus of a curved display of claim 1,
   wherein the transparent plate has a shape corresponding to the curved screen.

3. The touch recognition apparatus of a curved display of claim 1,
   wherein the infrared lamp is provided in the lateral side of the transparent plate in plural.

4. The touch recognition apparatus of a curved display of claim 1,
   wherein the infrared camera is disposed in an opposite side of the curved screen based on the transparent plate.

5. The touch recognition apparatus of a curved display of claim 1, further comprising:
   a projector disposed behind the curved screen and projecting the image to the curved screen;
   an aspheric mirror disposed between the projector and the curved screen, the aspheric mirror reflecting the image projected from the projector; and
   a reflective mirror disposed between the projector and the curved screen, the reflective mirror transferring the image reflecting from the aspheric mirror to the curved screen.

6. The touch recognition apparatus of a curved display of claim 1,
   wherein the curved screen comprises an acryl plate and a rear transmission film which is bonded to the acryl plate.

7. The touch recognition apparatus of a curved display of claim 1,
   wherein the transparent plate is made of a transparent acryl material.

8. A touch recognition apparatus of a curved display, comprising:
   a curved screen on which an image is displayed;
   a transparent plate provided in a rear of the curved screen;
   at least one infrared lamp provided in a lateral side of the transparent plate, the at least one infrared lamp irradiating infrared light;
   a uniformity tape disposed between the transparent plate and the at least one infrared lamp, the uniformity tape spreading the infrared light irradiated from the infrared lamp to the transparent plate; and
   an infrared camera configured to photograph an infrared image reflected from the curved screen.

9. The touch recognition apparatus of a curved display of claim 8,
   wherein the transparent plate has a shape corresponding to the curved screen.

10. The touch recognition apparatus of a curved display of claim 8,
   wherein the infrared camera is disposed in an opposite side of the curved screen based on the transparent plate.

* * * * *